United States Patent [19]

Straight

[11] Patent Number: 4,779,915

[45] Date of Patent: Oct. 25, 1988

[54] AIR FOIL SYSTEM

[76] Inventor: Gary D. Straight, 4201 Widgeon St., Fort Collins, Colo. 80524

[21] Appl. No.: 42,719

[22] Filed: Apr. 27, 1987

[51] Int. Cl.⁴ .............................................. B62D 35/00
[52] U.S. Cl. .................................... 296/180.3; 296/91
[58] Field of Search ................... 296/1 S, 91; D12/181

[56] References Cited

U.S. PATENT DOCUMENTS

| | | | |
|---|---|---|---|
| 3,945,677 | 3/1976 | Servais et al. | 296/1 S |
| 3,951,445 | 4/1976 | Tatom | 296/1 S |
| 4,084,846 | 4/1978 | Wiley, Jr. et al. | 296/1 S |
| 4,193,629 | 3/1980 | Merkle | 296/190 |
| 4,353,587 | 10/1982 | Brenholt | 296/1 S |
| 4,357,045 | 11/1982 | Kimford, Jr. | 296/1 S |
| 4,611,796 | 9/1986 | Orr | 296/1 S |
| 4,611,847 | 9/1986 | Sullivan | 296/1 S |
| 4,629,241 | 12/1986 | Gruich | 296/1 S |
| 4,685,715 | 8/1987 | Hardin | 296/1 S |

FOREIGN PATENT DOCUMENTS

| | | | |
|---|---|---|---|
| 2437075 | 2/1976 | Fed. Rep. of Germany | 296/1 S |
| 2461299 | 7/1976 | Fed. Rep. of Germany | 296/1 S |
| 2717661 | 10/1978 | Fed. Rep. of Germany | 296/1 S |
| 2838150 | 3/1980 | Fed. Rep. of Germany | 296/1 S |
| 2949128 | 6/1981 | Fed. Rep. of Germany | . |
| 2951982 | 7/1981 | Fed. Rep. of Germany | 296/91 |

OTHER PUBLICATIONS

Automotive News, Apr. 14, 1986, p. E20, ATP-11 Photo.
Mechanix Illustrated, December 1983, p. 96, Europe's Sleek Lightweight Trucks.

Primary Examiner—Dennis H. Pedder
Attorney, Agent, or Firm—Dean P. Edmundson

[57] ABSTRACT

An air foil system for detachable adjustable mounting to the frame of a truck tractor rearwardly of the cab (or the sleeper compartment if there is one) for reducing air resistance encountered by a trailer towed by the truck tractor. The air foil system includes: (a) an upright support member including attachment means on its base which is adapted to detachably mount the support member to the tractor frame rearwardly of the cab, the support member having a transverse dimension approximately equal to the width of the cab; (b) an air foil adjustably mounted on top of the support member in a manner such that the air foil is adapted to extend above the cab; and (c) an adjustable side panel mounted on each end of the support member, each side panel extending downwardly from the top of the support member toward the base. Each side panel has a height greater than its width. The air foil systyem can be detached and removed from one truck tractor and installed on another tractor very easily and without modifying the tractor.

19 Claims, 10 Drawing Sheets

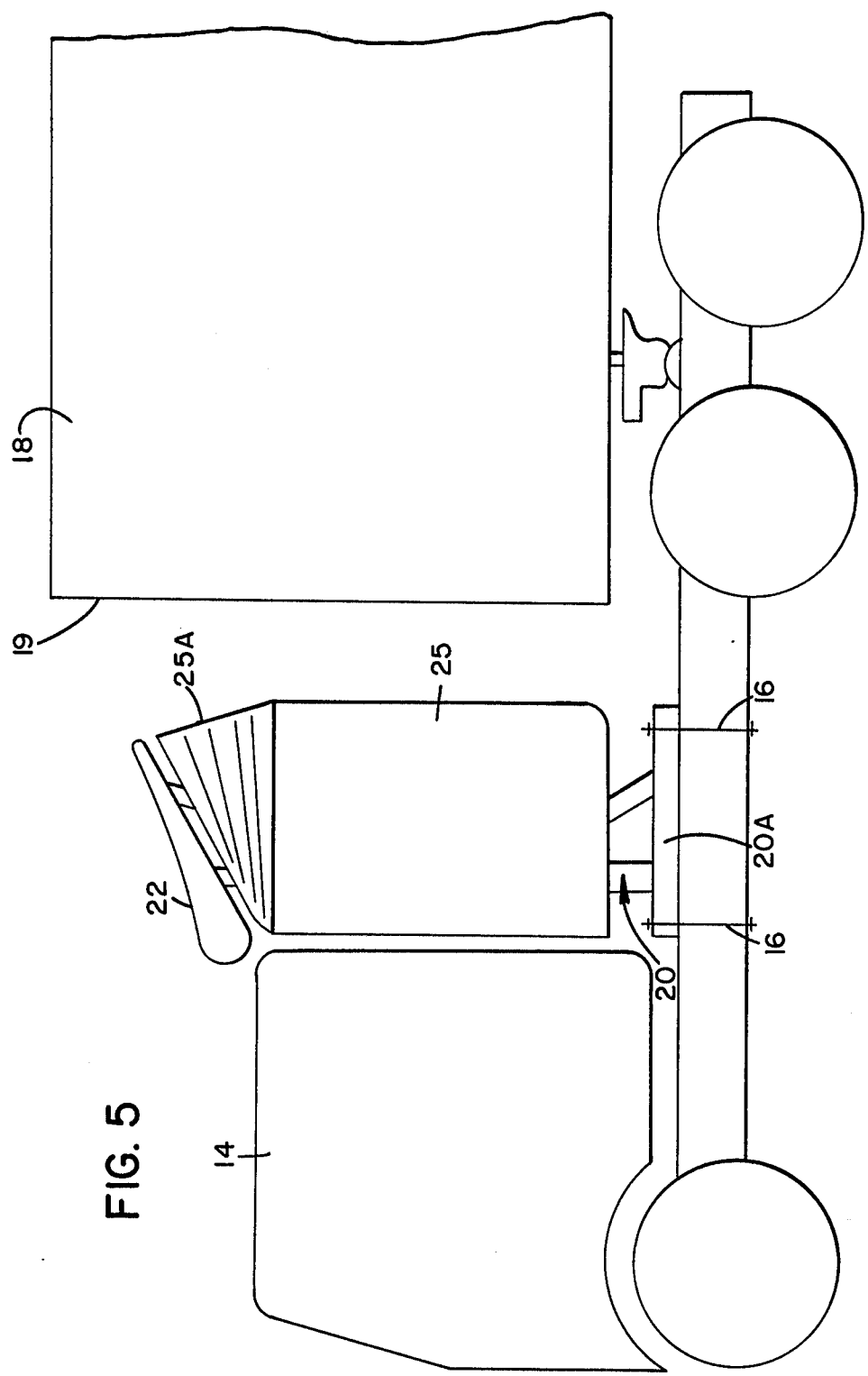

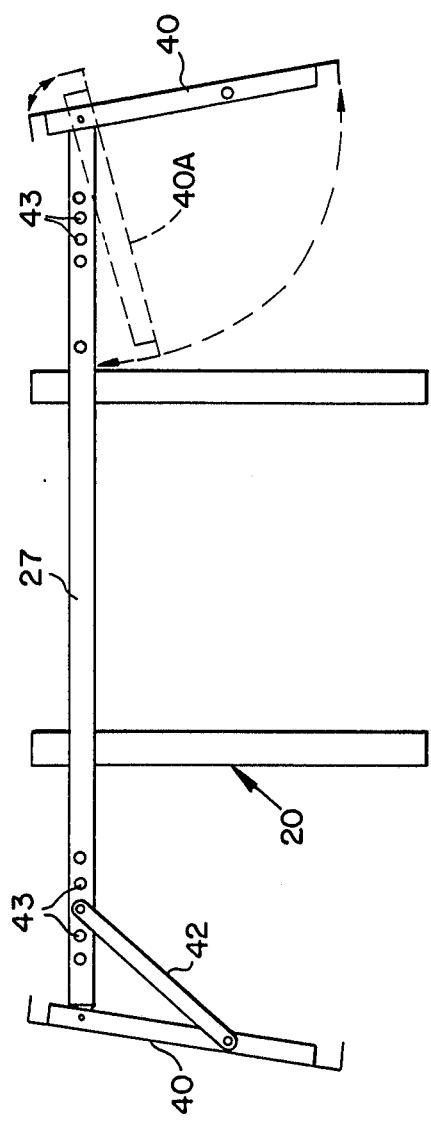

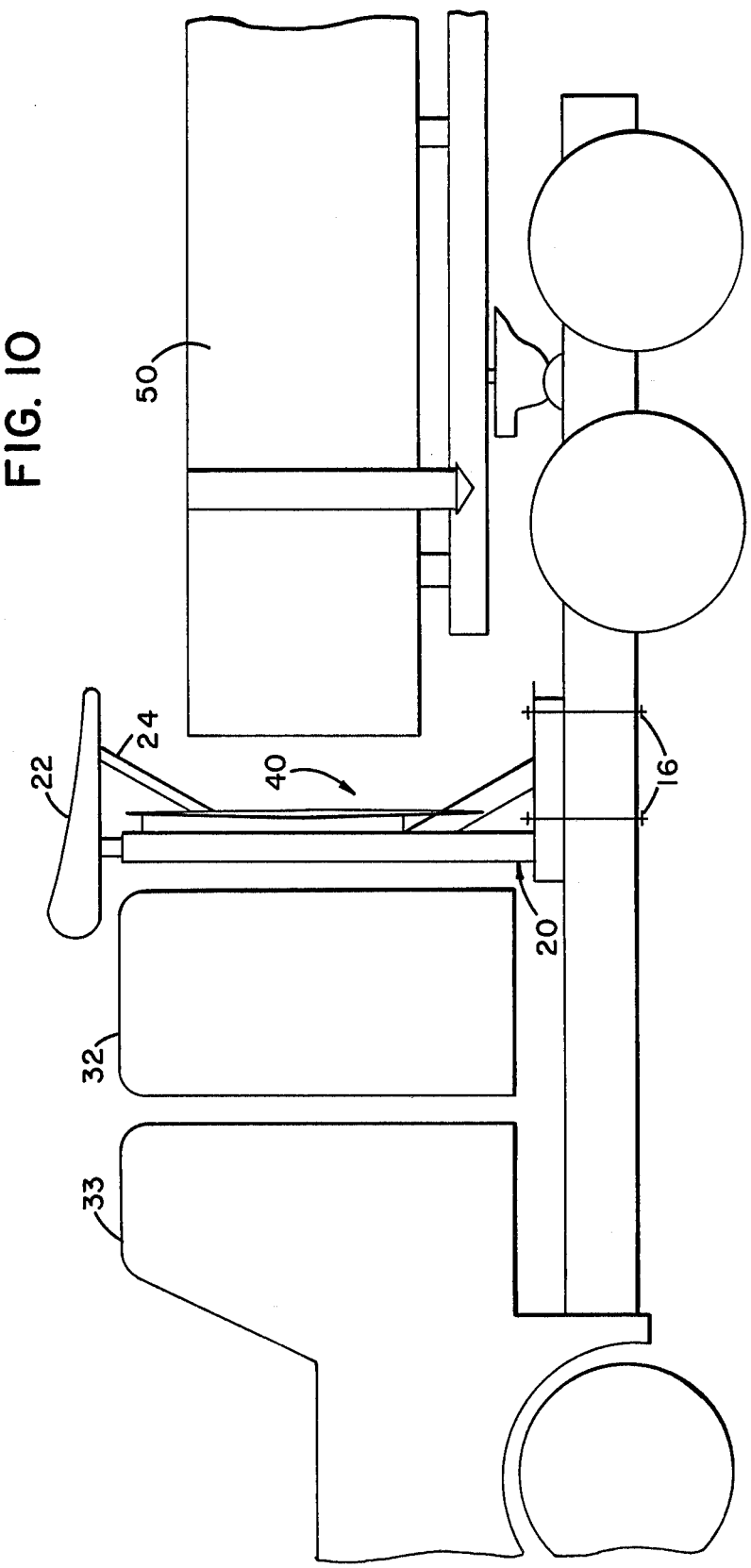

AIR FOIL SYSTEM

FIELD OF THE INVENTION

This invention relates to air foil systems and air deflection systems for reducing aerodynamic drag on tractor-trailer vehicles of the type used for hauling cargo. More particularly, this invention relates to air foil systems which are mounted on the tractor frame rearwardly of the tractor cab or sleeper compartment. Even more particularly, this invention relates to air foil systems which are adaptable to all types of truck tractors

BACKGROUND OF THE INVENTION

A common problem encountered by conventional tractor-trailer cargo hauling vehicles is the effect of air resistance or drag when traveling down the road. Typically the trailer extends to a height far above the height of the tractor cab. Because such trailers include a planar front face which is normally perpendicular to the direction of travel, the front face of a trailer presents significant resistance to air flow when it is pulled on the highway.

Similar resistance to air flow is encountered when high loads are carried on flat bed trailers. Also, resistance to air flow is encountered at the sides of the front face of the trailer or the load being hauled.

Various types of air deflector arrangements have been previously used on tractors and trailers to reduce resistance to air flow. The simplest device which is commonly used is an air deflector rigidly mounted on the top of the tractor cab or sleeper compartment to deflect air upwardly. Although use of such a device is helpful when the tractor is towing a trailer having a high front face, such device is not helpful when towing a flat bed trailer with a load which does not extend above the tractor cab. Such a deflector does not reduce resistance to air flow at the edges of the forward end of the load being carried on the trailer.

Other types of air deflector systems are describe, for example, in U.S. Pat. Nos. 4,611,796; 4,629,241; 4,353,587, 4,611,847; 4,357,045; and 3,945,677, and in West German O.L.S. Nos. 2437075 and 2949128. Many of such systems are very expensive and cumbersome to install and use. As a result, they are not practical for most purposes. Furthermore, some such systems cannot be used in conjunction with flat bed trailers. Most of such systems require permanent attachment to the body of the tractor cab or the trailer and are not adaptable to various types of trailers to be towed by the truck tractor.

For example, some of the previous systems are designed only for use with a van type trailer of a specific height and width. In other words, many of such systems are custom made for a particular truck and a particular application. Thus, when the truck tractor is disengaged from a van type trailer and connected to a flat bed trailer (e.g., for hauling lumber or pipe), the air deflector system on the tractor may be inefficient or useless. Other systems intended for use with a van type trailer having a planar front face may not be appropriate for use with trailers having a refrigeration unit mounted on its front face.

Also, conventional air deflector systems are permanently mounted to the truck tractor cab or sleeper unit and accordingly cannot be easily removed. If they are removed there are numerous holes which must be filled to prevent moisture, dirt and air from passing through the holes in the cab or sleeper. Thus, as a practical matter, the air deflector system must remain with the truck tractor on which it is installed. This limits the adaptability of the truck tractor for use with a variety of trailers an loads.

There has not heretofore been provided an air foil system which can be effectively used on all types of truck tractors and which can be easily removed, if desired.

SUMMARY OF THE PRESENT INVENTION

In accordance with the present invention there is provided an air foil system for detachable mounting to the frame of a truck tractor. The air foil system can be installed on any conventional truck tractor without modifying the tractor and without having to secure the system to the cab or sleeper unit of the tractor.

The air foil system of the invention is effective in reducing air drag by displacing air over and around an enclosed trailer or a high load carried on a flat bed trailer (e.g., lumber, etc.). The air foil system also minimizes the distance between the trailer and the foil.

The air foil system comprises:

(a) an upright support member which includes attachment means on the base thereof which is adapted to detachably mount the support member to the frame of the tractor rearwardly of the cab (or rearwardly of the sleeper compartment if the truck includes one);

(b) an air foil mounted on top of the support member in a manner such that it extends above the cab; and (c) a side panel mounted on each end of the support member; wherein each side panel extends downwardly from the top of the support member toward the base.

The length of the support member is approximately equal to the width of the cab or the sleeper compartment. The side panels are generally flush with the side edges of the cab or sleeper unit and extend rearwardly toward the side edge of the trailer.

If the trailer is the same width as the cab or sleeper unit of the truck the side panels are parallel to, and aligned with, the side edges of the cab and the trailer. If the trailer is wider than the cab or sleeper unit, then the front edge of each side panel is aligned with the edge of the cab or sleeper unit and the rear edge of each panel is angled outwardly toward the side edge of the trailer.

The air foil system is not limited by the height of the cab, or its width, or its distance from the front face of the trailer. The air foil system can be matched with and used on any conventional truck tractor cab style, and regardless of the type of trailer to be towed (e.g., dry van, refrigerated van, flat bed, etc.).

Another unique feature of the air foil system of the invention is that it is entirely independent of the cab or sleeper unit. It is not necessary to drill holes in the cab or sleeper unit or otherwise secure the system to the cab or sleeper unit. Because the air foil system is entirely supported by the frame of the tractor, the system may be installed or removed very easily and quickly. It can also be moved from one truck to another when a truck is taken out of service or sold.

In one embodiment the side panels can be folded inwardly toward the back side of the support member so that they are out of the way when the tractor is pulling a flat trailer and a cargo (e.g., lumber) projects over the front end of the trailer.

Other advantages of the air foil system of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which:

FIG. 5 is a side elevational view illustrating another embodiment of air foil system of the invention;

FIG. 9 is a top view illustrating another embodiment of the invention; and

FIG. 10 is a side elevational view illustrating the embodiment of air foil system with side panels folded inwardly toward the back side of the support member.

DETAILED DESCRIPTION OF THE INVENTION

Figure 1:
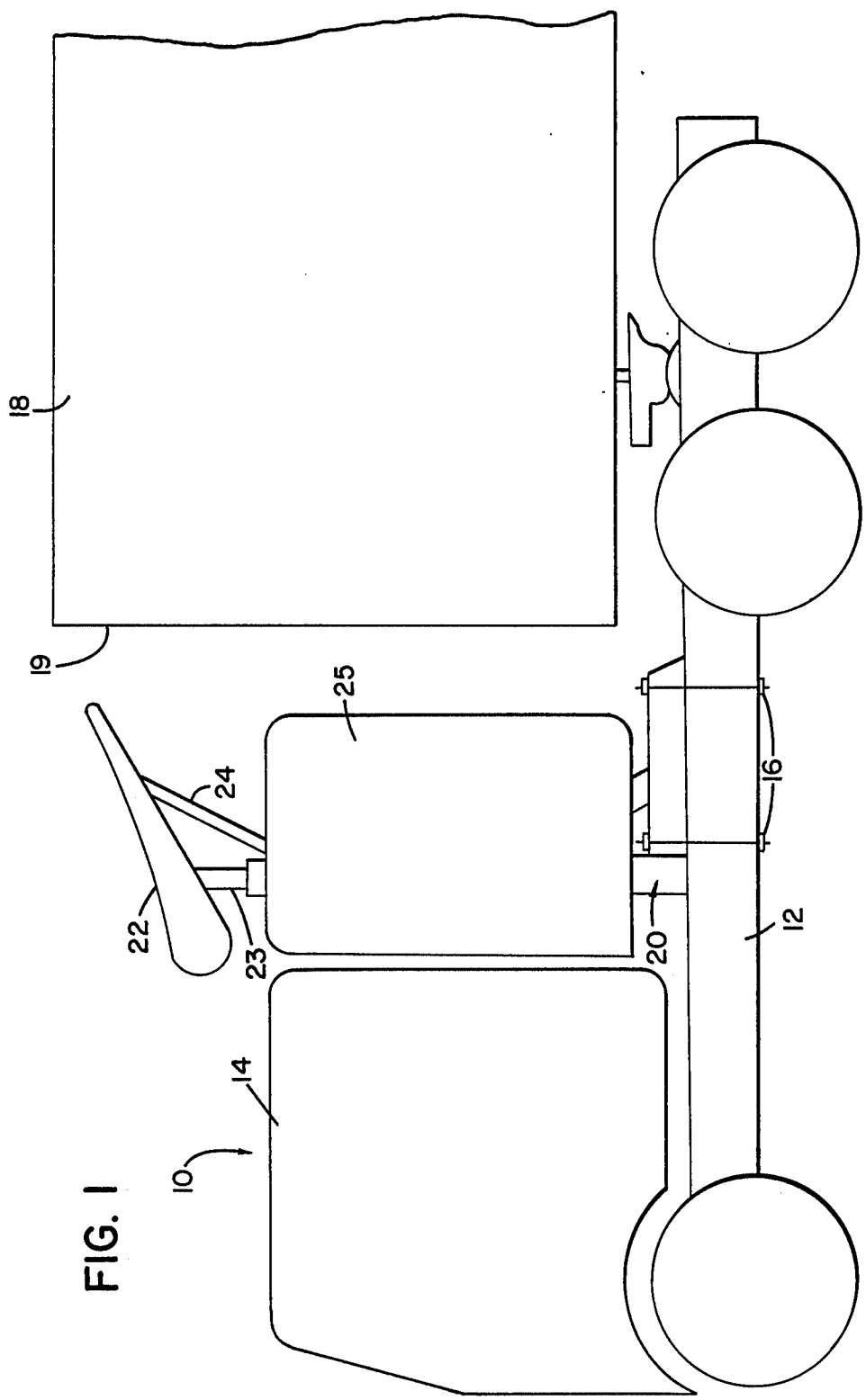
FIG. 1 is a side view of an air foil system of the invention mounted on a conventional truck tractor towing a closed van type trailer.

In FIG. 1 there is shown a side elevational view of an air foil system of the invention detachably mounted to the frame 12 of a truck tractor 10 rearwardly of the cab 14 by means of U-bolts 16. The tractor is shown towing a conventional van-type trailer 18 having planar front face 19.

The air foil system of the invention includes a support member 20 whose base is detachably mounted to the frame 12 of the tractor, as illustrated. The support member preferably has a length (i.e., a transverse dimension) of about 8 feet. Mounted at the top of the support member 20 is air foil 22. The air foil is braced by brace members 23 and 24, and the air foil extends above the height of the cab 14. The foil is angled upwardly so that it will deflect air upwardly and over the top of the front face 19 of trailer 18 as it is towed.

Attached to each side or end of the support member 20 is a side panel 25 which extends downwardly from the upper portion of the support member toward the base of the support member. Preferably each side panel extends downwardly from a point near the top edge of the cab 14 to a point near the lower edge of the trailer 18 being towed.

Preferably each side panel is generally rectangular and has a height greater than its width, as illustrated. The height of the side panels will be dependent upon the height of the cab, and the width of the side panels will be dependent upon the distance between the rear of the cab and the front face of the trailer. Generally the width of the side panels will be in the range of about 24 to 36 inches. Preferably the rear edge of each side panel will extend to within about 17 inches of the front face of the trailer (so as to leave sufficient clearance to permit the tractor to turn corners without having the front corners of the trailer strike the side panels).

The entire air foil system is preferably made of aluminum because it is light in weight, corrosion-resistant, and has sufficient structural integrity. If desired the air foil system could be made of stainless steel or fiberglass.

The height of the side panels may vary, depending upon the height of the cab. Typically the side panels are about 48 inches in height but may be larger, if desired.

Figure 2:
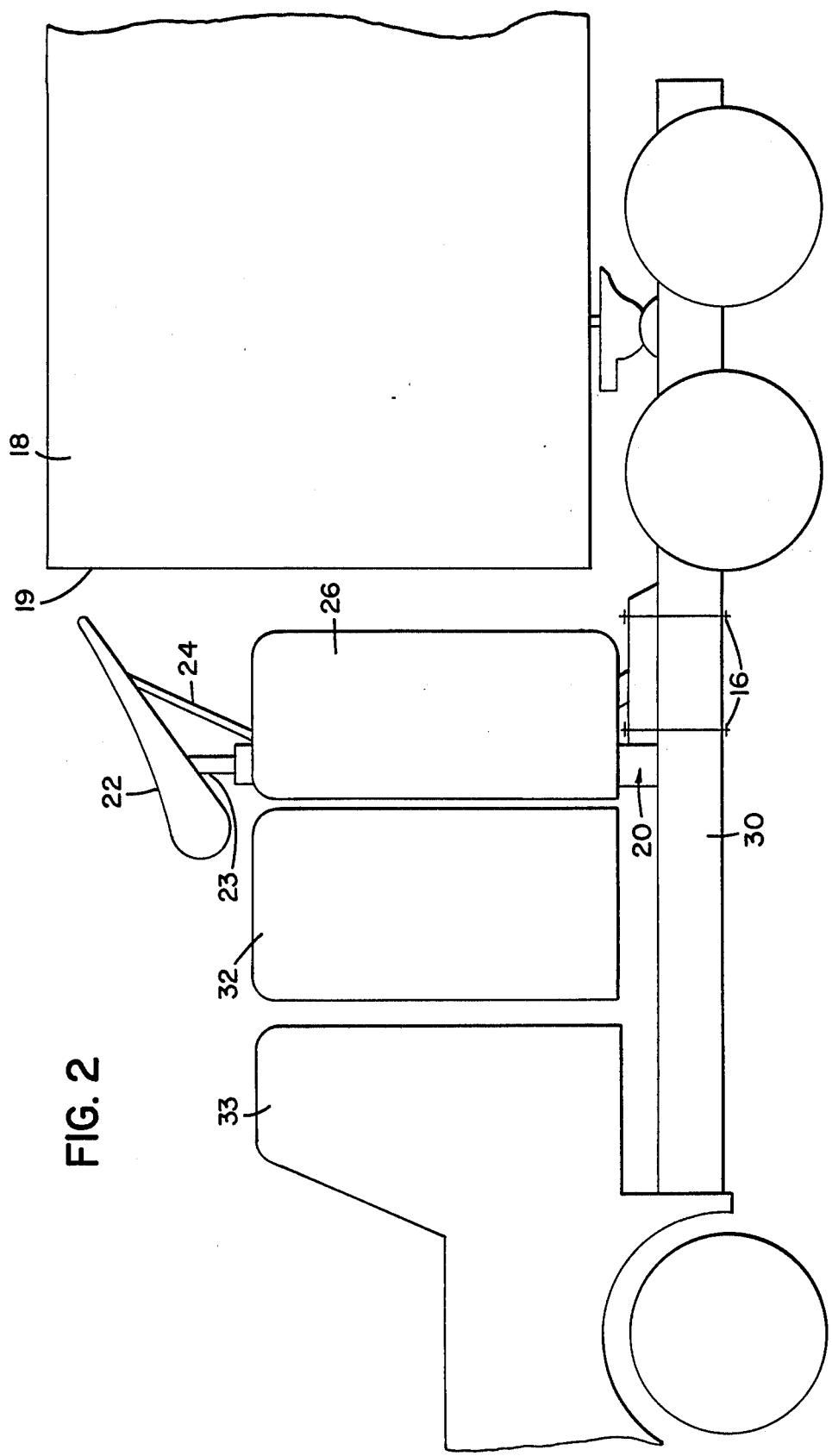
FIG. 2 is a side view of an air foil system of the invention mounted on a conventional truck tractor including a sleeper compartment; the tractor is shown towing a closed van type trailer.

In FIG. 2 the air foil system of the invention is shown mounted to a tractor frame 30 rearwardly of sleeper compartment 32. The sleeper unit is located rearwardly of cab 33 on frame 30. In this embodiment the side panels are narrower than the side panels shown in FIG. 1 because there is less distance between the rear of sleeper unit 32 and trailer face 19 than there is between cab 14 and trailer face 19 in FIG. 1.

Figure 3:
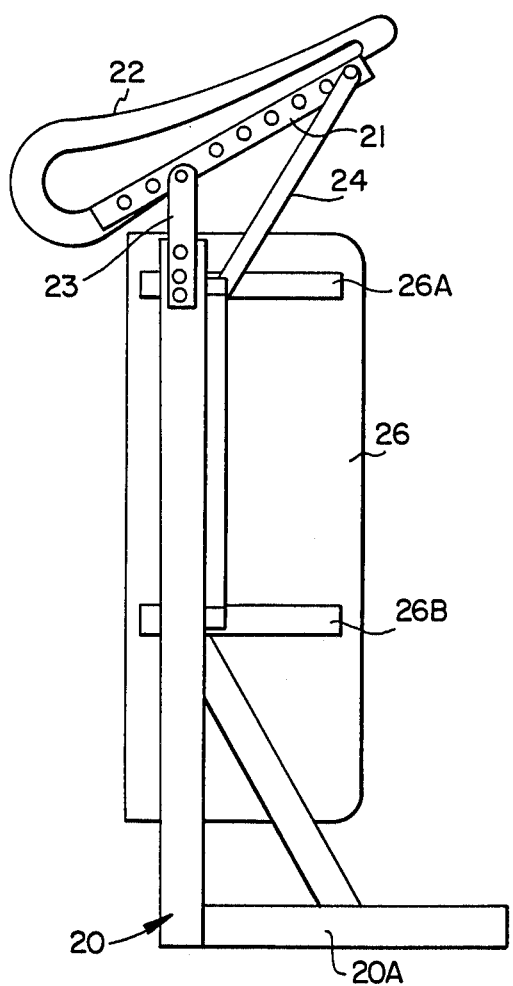
FIG. 3 is a cross-sectional view illustrating one embodiment of air foil system of the invention.

FIG. 3 is a cross-sectional view illustrating the air foil system shown in FIG. 2. Thus, there is shown an upright support member 20 to which a side panel 26 is secured by means of mounts or brackets 26A and 26B. Base 20A of Support member 20 is for securing the support member to the truck frame. At the top of the support member there is mounted air foil 22 by means of brackets 23 and 24. A mounting bracket 21 on air foil 22 includes several holes to permit adjustable mounting of the air foil. In other words, the air foil may be pivoted to any desired position and then secured.

Figure 4:
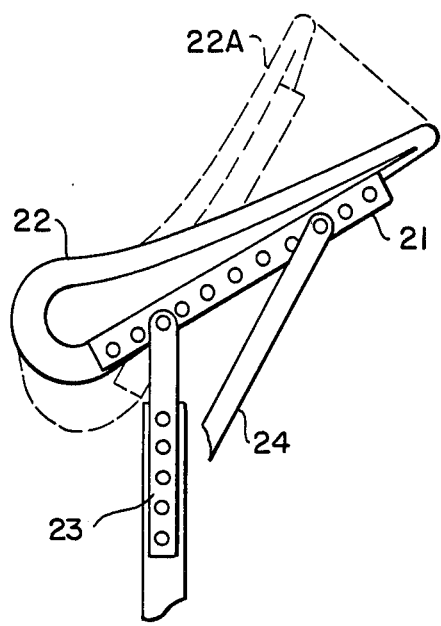
FIGS. 4 and 4A are side elevational views illustrating the manners in which the air foil is adjustable.
Figure 4A:
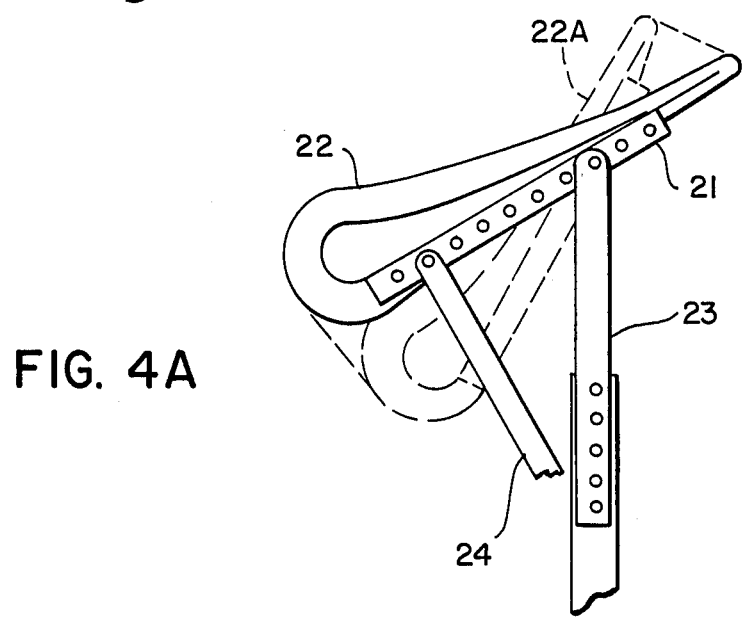

FIGS. 4 and 4A are side views which illustrate various manners in which the air foil may be adjustably mounted. In FIG. 4 the air foil is pivotably mounted near its front edge, and the rear portion may be raised or lowered as desired before being secured in position. In FIG. 4A the air foil is pivotably mounted at its rear portion, and the front may be raised or lowered as desired before being secured in position. The shape of the air foil may also vary.

In FIG. 4 the air foil 22 is shown mounted in one position, and dotted lines 22A illustrate another mounting position. Brackets 21 and 23 each include several mounting holes to facilitate mounting of the air foil at the desired height and with the desired tilt. In this version the front portion of the air foil 22 is supported by bracket 23 and the rear portion is shown supported by bracket 21.

In FIG. 4A the front portion of air foil 22 is shown supported by bracket 24 and the rear portion is supported by bracket 23. This type of mounting enables the air foil to project further forward than in the type of mounting shown in FIG. 4. This may be useful, for example, when the trailer being towed has a refrigeration unit on the front face thereof and it is necessary to mount the air foil forward of the refrigeration unit so that there is sufficient clearance therebetween.

In FIG. 5 there is shown a side elevational view of the truck tractor-trailer combination shown in FIG. 1, wherein the air foil system further includes a corner deflector 25A mounted to the top of each side panel. The corner deflector 25A slopes upwardly and rearwardly from the front of the side panel to the back edge of the air foil 22. This provides additional aerodynamic characteristics to the air foil system and reduces air resistance at the upper corners of the front face 19 of the trailer 18.

Figure 6:
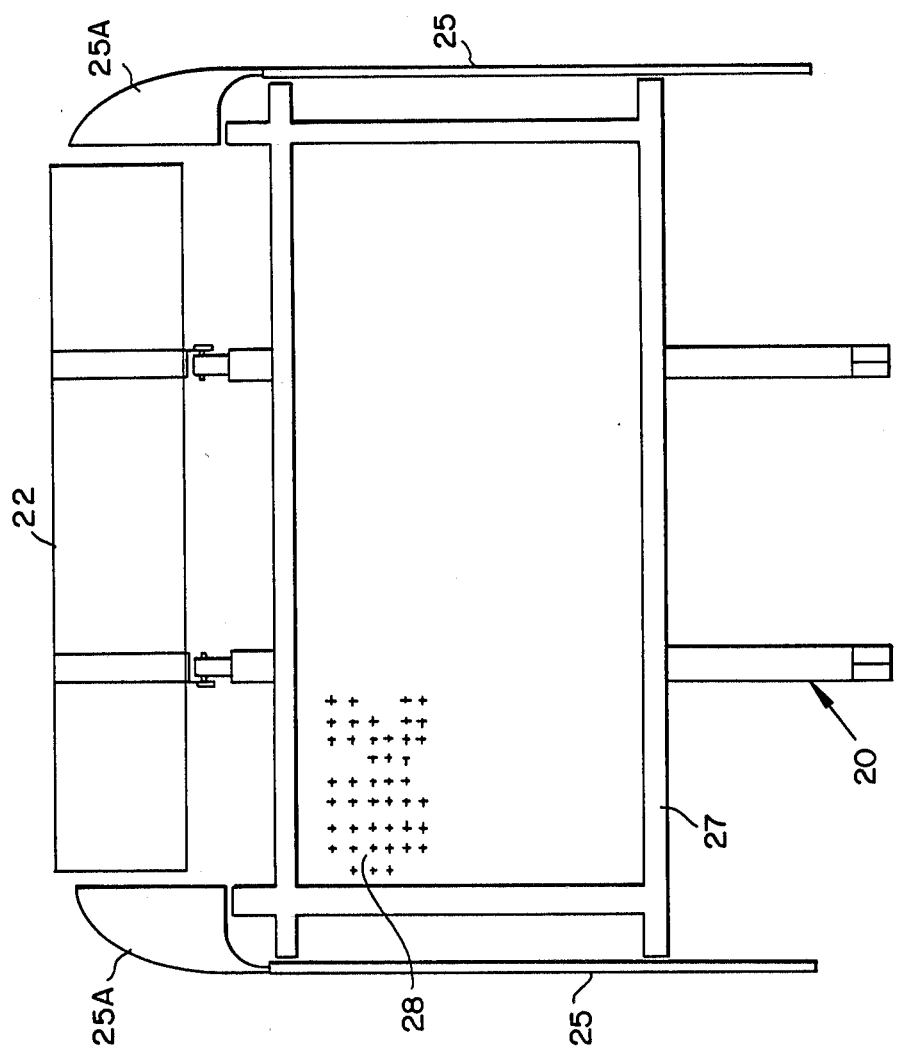
FIG. 6 is a rear elevational view of the air foil system shown in FIG. 5.

FIG. 6 is a rear elevational view of the air foil system shown in FIG. 5, including central air foil 22, corner deflectors 25A secured to the top of side panels 25, and plate 28 which extends across the entire length of support member 20. The plate 28 is secured to framework 27, for example, with bolts or by welding. If plate 28 is sufficiently impact-resistant, it may serve as a headache rack when towing a flat trailer.

Figure 7:
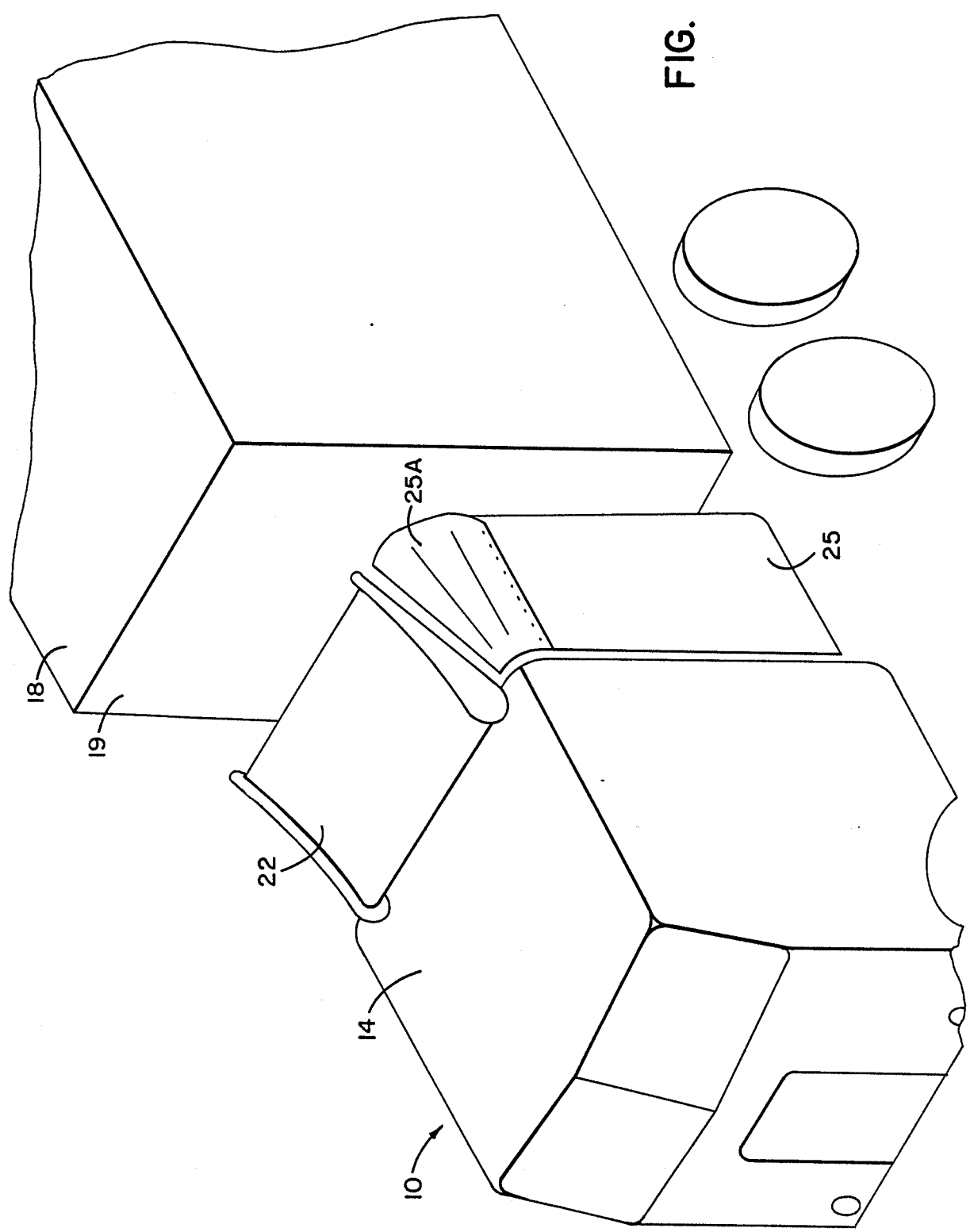
FIG. 7 is a perspective view illustrating the sloping deflector positioned at the top of the side panel in the system shown in FIG. 6.

In FIG. 7 there is shown a perspective view of a portion of the air foil system including the central foil 22, side panel 25, and corner deflector 25A.

Figure 8:
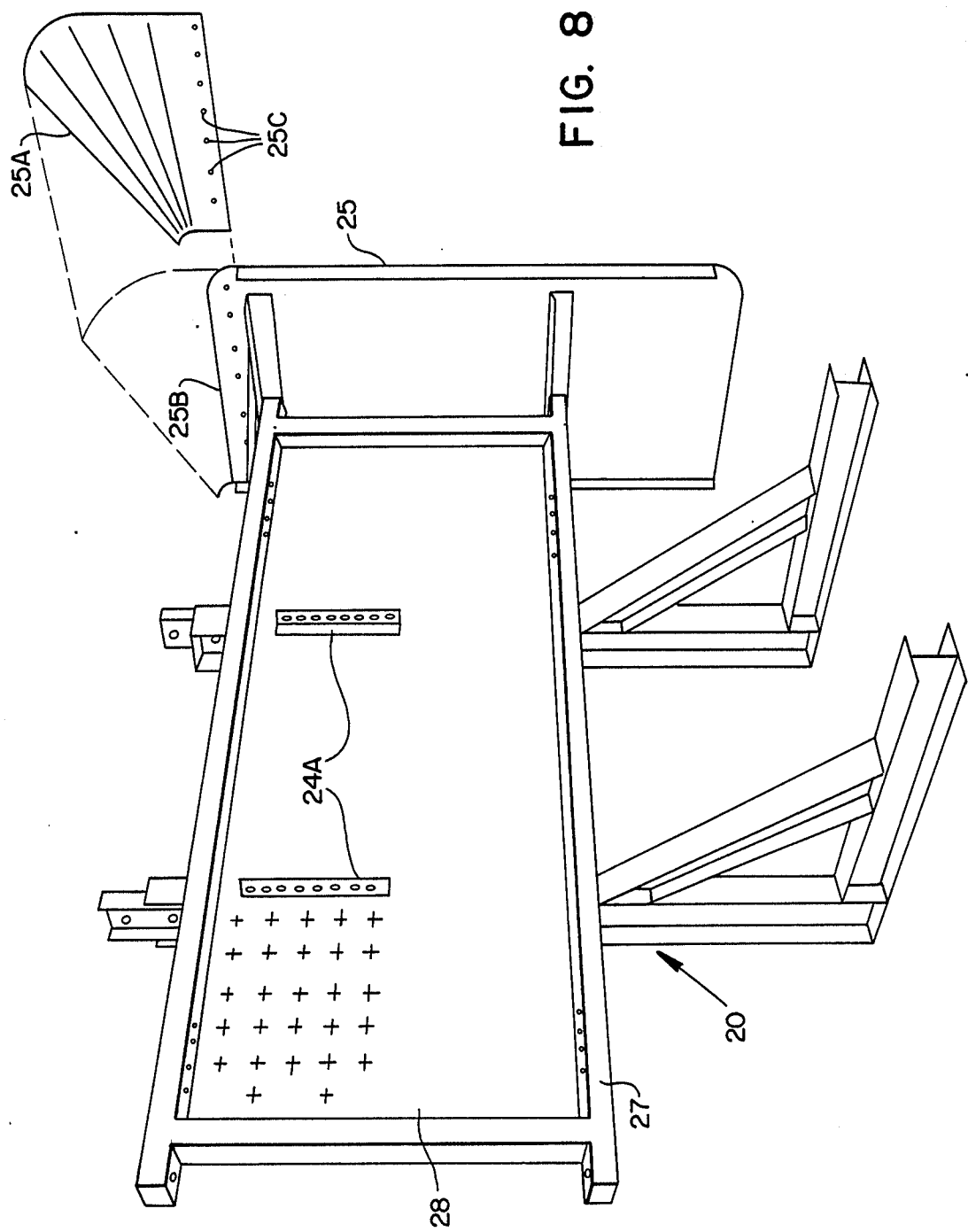
FIG. 8 is a rear perspective view illustrating another construction of an air foil system of the invention.

In FIG. 8 there is shown a rear perspective view of support member 20, plate 28 secured to framework 27, and a side panel 25. The top edge 25B of panel 25 is shown curved inwardly. This feature may be desired so as to have the top of panel 25 exhibit the same curvature as the side edges of the cab of the truck tractor to which the air foil system is attached.

Also shown in FIG. 8 is corner deflector 25A prior to attachment to the top of side panel 25. Apertures 25C along the lower edge of deflector 25A facilitate attachment of the deflector to panel 25 with rivets, bolts, etc. Brackets 24A have numerous holes therein for adjustable mounting of bracket arm 24 supporting the rear portion of the air foil.

FIG. 9 is a top view of a portion of an air foil system of the invention in which the side panels 40 are pivotably mounted near their front edge to support member 20. Brace member 42 is attached between the side panel and the framework 27 of support member 20 to hold the side panel in the desired position.

In this manner the rearward end of the side panel may be angled outwardly, if desired. Also, the side panels may be pivoted inwardly toward the back side of the support member, if desired, as illustrated by dotted lines 40A. The brace 42 may be secured at each end by means of bolts or pins. Alternatively, the brace 42 may be telescoping to enable the side panel to be adjusted as to its angle relative to the framework 27.

FIG. 10 is a side elevational view illustrating the air foil system shown in FIG. 9 with the side panels 40 folded inwardly against the back side of the support member. The central foil 22 is tilted to a horizontal position because the cargo 50 being hauled on the flat bed trailer does not extend above the top of the cab 32. The cargo (e.g., lumber) projects forwardly of the front end of the trailer. Consequently, it is desired to fold the side panels 40 against the back side of support 20 so that the cargo will not strike the side panels when the tractor turns corners.

Other variants are possible without departing from the scope of the present invention.

What is claimed is:

1. An air foil system for mounting to the frame of a truck tractor rearwardly of the cab thereof for reducing air resistance encountered by a trailer towed by said truck tractor, said air foil system comprising:
   (a) an upright support member including attachment means on the base thereof adapted to detachably engage longitudinal from rails of said frame rearwardly of said cab, said support member having a transverse dimension approximately equal to the width of said cab; said support member having first and second transverse ends;
   (b) an adjustable air foil mounted on top of said support member in a manner such that said air foil is adapted to extend above said cab; and
   (c) an adjustable side panel mounted on each of said first and second ends of said support member, each said side panel extending downwardly from the top of said support member toward said base; wherein each said side panel has a height greater than its width;
wherein said air foil system can be adjustably mounted on said frame independently of said cab to allow positioning with respect to both said frame and said cab in a longitudinal direction of said frame rails.

2. An air foil system in accordance with claim 1, wherein said attachment means comprises U-bolts for detachably securing said base of said support member to said frame.

3. An air foil system in accordance with claim 1, wherein each said side panel has a width in the range of about 24 to 36 inches.

4. An air foil system in accordance with claim 1, wherein said support member has a transverse dimension of about 8 feet.

5. An air foil system in accordance with claim 1, wherein said air foil is pivotably mounted on said support member.

6. An air foil system in accordance with claim 1, wherein each said side panel includes a leading edge and a trailing edge, wherein said leading edge is pivotably mounted on said support member in a manner such that said trailing edge may be angled outwardly.

7. An air foil system in accordance with claim 1, wherein the top of each said side panel is curved inwardly.

8. An air foil system in accordance with claim 1, further including a corner deflector member secured to the top of each said side panel, wherein said corner deflector is sloped upwardly and rearwardly between said side panel and said air foil.

9. An air foil system in accordance with claim 1, wherein each said side panel includes a leading edge and a trailing edge, wherein said leading edge is pivotably mounted on said support member in a manner such that said side panel may be pivoted inwardly toward said support member.

10. A truck tractor of the type including a cab and a frame, wherein the improvement comprises an air foil system mounted on said frame, said system comprising:
   (a) an upright support member including attachment means on the base thereof adapted to detachably engage longitudinal frame rails of said frame rearwardly of said cab, said support member having a transverse dimension approximately equal to the width of said cab; said support member having first and second transverse ends;
   (b) an adjustable air foil mounted on top of said support member in a manner such that said air foil is adapted to extend above said cab; and
   (c) an adjustable side panel mounted on each of said first and second ends of said support member, each said side panel extending downwardly from the top of said support member toward said base; wherein each said side panel has a height greater than its width;
wherein said air foil system is detachably adjustably mounted to said frame independently of said cab to allow positioning with respect to both said frame and said cab in a longitudinal direction of said frame rails.

11. The improvement of claim 10, wherein the top edge of each side panel is at the same height as the top of said cab, wherein each said side panel has a width in the range of about 24 to 36 inches, and wherein said support member has a transverse dimension of about 8 feet.

12. The improvement of claim 10, wherein said air foil is pivotably mounted on said support member.

13. The improvement of claim 10, wherein each said side panel includes a leading edge and a trailing edge, wherein said leading edge is pivotally mounted on said support member.

14. The improvement of claim 10, wherein the top of each said side panel is curved inwardly.

15. The improvement of claim 10, wherein said truck tractor includes a sleeper compartment mounted rearwardly of said cab, and wherein said air foil system is mounted rearwardly of said sleeper compartment.

16. The improvement of claim 10, wherein said air foil system further includes a corner deflector member secured to the top of each said side panel, wherein said corner deflector is sloped upwardly and rearwardly between said side panel and said air foil.

17. A method for reducing air resistance encountered by a trailer being towed by a truck tractor of the type having a cab and a frame, said method comprising the steps of:
 (a) detachably adjustably mounting the base of an upright support member to longitudinal frame rails of said frame of said truck tractor rearwardly and independently of said cab to allow positioning with respect to both said frame and said cab in a longitudinal direction of said frame rails, wherein said support member has a transverse dimension approximately equal to the width of said cab; wherein said support member including first and second transverse ends;
 (b) attaching an adjustably air foil to the top of said support member in a manner such that said air foil projects above said cab;
 (c) attaching an adjustable side panel to each of said first and second ends of said support member; wherein each said side panel extends downwardly from the top of said support member toward said base; and wherein each said side panel extends rearwardly toward said trailer.

18. A method in accordance with claim 17, wherein said truck tractor includes a sleeper compartment rearwardly of said cab, and wherein said upright support member is mounted to said frame rearwardly of said sleeper compartment.

19. A method in accordance with claim 17, wherein each said side panel includes a leading edge and a trailing edge, wherein said leading edge is pivotally mounted on said support member in a manner such that said trailing edge may be angled outwardly.

* * * * *